United States Patent

[11] 3,632,206

[72] Inventors: Othmar Schneider;
Berthold Fergg; Wolfgang Zahn, all of Munich, Germany
[21] Appl. No.: 861,279
[22] Filed: Sept. 26, 1969
[45] Patented: Jan. 4, 1972
[73] Assignee: Agfa-Gevaert Aktiengesellschaft Leverkusen, Germany
[32] Priority: Sept. 27, 1968
[33] Germany
[31] P 17 97 436.6

[54] DUPLICATING APPARATUS
10 Claims, 1 Drawing Fig.
[52] U.S. Cl. ............................................. 355/68
[51] Int. Cl. ........................................... G03b 27/74
[50] Field of Search ................................. 355/68

[56] References Cited
UNITED STATES PATENTS
2,201,606  5/1940  Bing .......................... 355/68
2,258,994  10/1941  Merriman .................... 355/68
2,353,218  7/1944  Burnham ..................... 355/68
3,102,450  9/1963  Grossmann ................... 355/68

Primary Examiner—Samuel S. Matthews
Assistant Examiner—Monroe H. Hayes
Attorney—Michael S. Striker ABSTRACT: An arrangement for controlling the exposure times of duplicators. In addition to the light source used for carrying out the exposure, a constant light source is used for applying the light to the photoelectric device in the duplicator, when the duplicator is not in use, for the purpose of maintaining the photoelectric fatigue effect constant. The constant light source is also used for calibrating the controlling circuitry for the exposure time. A timer connected to the switching circuitry which establishes the exposure interval gives an indication of the measured time interval. Adjustable resistors permit settings and compensations for the varying characteristics of the duplicating paper, as well as the characteristics of the individual duplicating machines.

PATENTED JAN 4 1972 3,632,206
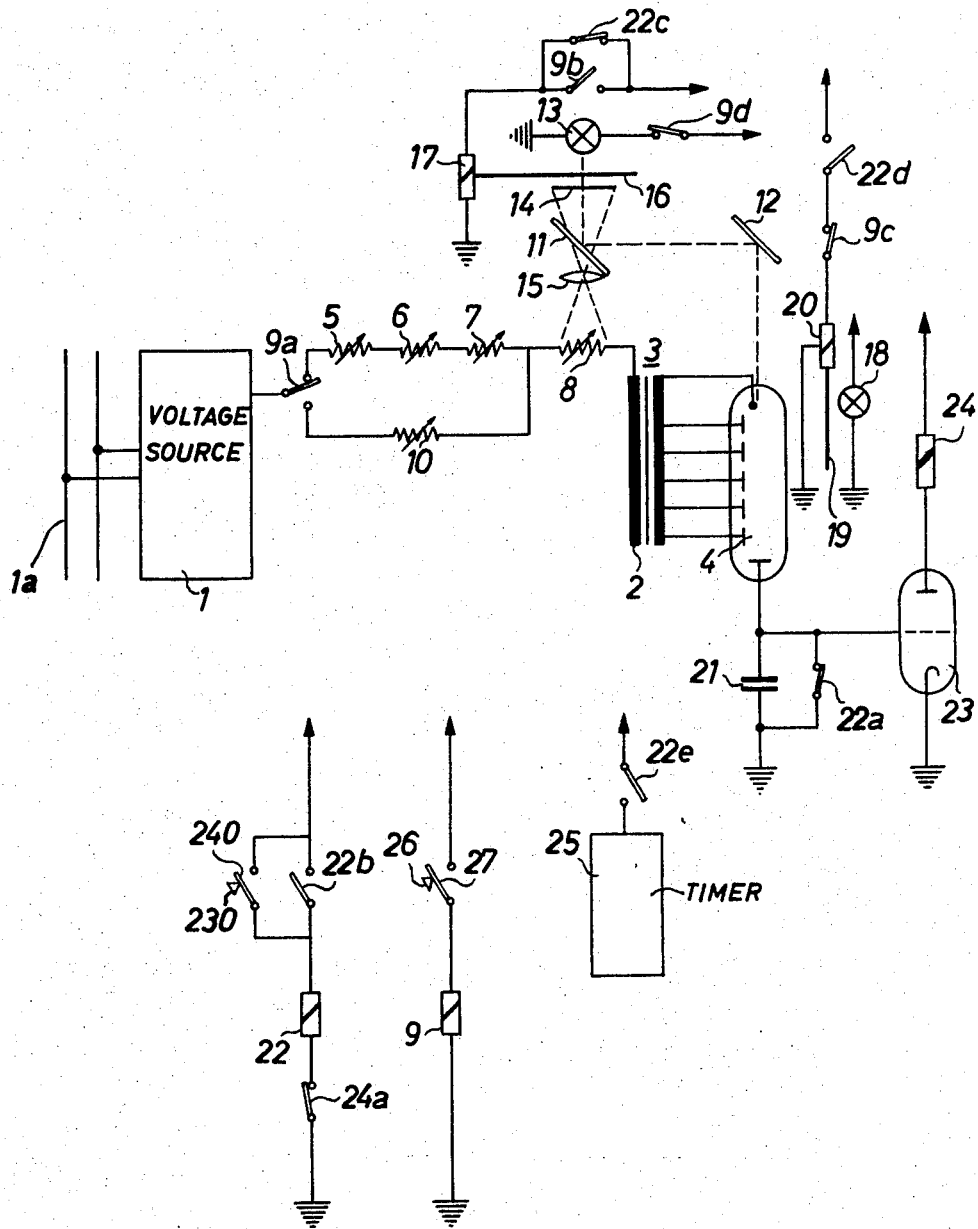
INVENTOR.
OTHMAR SCHNEIDER
BERTHOLD FERGG
BY WOLFGANG ZAHN 3,632,206

DUPLICATING APPARATUS

BACKGROUND OF THE INVENTION

The present invention relates to photographic copying or duplicating apparatus with a photoelectric timing circuit for terminating the exposure when a predetermined amount of light has been incident upon the copy paper or copy material. The light is also incident upon a photoelectric device within the timing circuit which is also exposed to the light of an auxiliary lamp when the duplicator is not in use. The intensity of light applied to the photoelectric device during the periods when a duplicating process is not carried out is somewhat intermediate or in between the intensity used during the copying process.

The reason for using such an auxiliary lamp during the time intervals when the duplicator is not in use is to maintain constant the photoelectric fatigue of the photoelectric device.

It is known in the art to use electron multipliers in duplicating apparatus of the preceding species, for the photoelectric device, and to provide a lit lamp during the times when the duplicator is not in use, for the purpose of maintaining constant the photoelectric fatigue of the device. It is also known in the art to use a lamp with constant intensity for the purpose of adjusting the sensitivity of the photoelectric circuit, instead of a calibrating negative of known thickness or density. The known intensity of the lamp emitting constant light corresponds to a predetermined exposure time of the controlled circuitry, while taking an exposure.

It is an object of the present invention to simplify the calibrating process and to reduce the complexity in equipment in the duplicating apparatus.

In accordance with the present invention, the lamp with constant light is arranged in the duplicating apparatus so as to adjust the sensitivity of the controlling circuitry through an adjustable calibrating resistor in the circuit of the photoelectric device. A timer is used in conjunction with the circuitry so that when the copying lamp of the duplicator is turned off, it is possible to determine the exposure time in relation to the light from the constant intensity lamp.

Through the use of the lamp which is directed at the photoelectric device when the duplicator is not in use, for the purpose of maintaining the photoelectric fatigue of the device substantially constant, the calibrating process for the duplicating apparatus may also be considerably simplified. Furthermore, through the use of unique switching circuitry, the operation of the duplicating apparatus becomes further simplified.

SUMMARY OF THE INVENTION

An arrangement by which the exposure time of duplicators may be adjusted against a constant calibrating light source. A photoelectric multiplier is exposed to the light used for the copying process. A second calibrating lamp is also used to apply light to the photoelectric device for the purpose of maintaining constant the photoelectric fatigue. The exposure time is set through a switching circuit to which a timer is connected for measuring and indicating the exposure time. Adjustable resistors may be set to vary the exposure time as a function of the characteristics of the duplicating paper and the duplicating machine. A capacitor charged by the photoelectric device, switches a tube when the charge across the capacitor reaches a predetermined magnitude, and thereby establishes the duration of the exposure interval.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical schematic diagram of the arrangement for controlling the exposure time of the duplicators through the use of the constant light lamp source and timer combination, in accordance with the present invention.

DESCRIPTION OF THE PREFERRED EMBODIMENTS

Referring to the drawing, the latter discloses, in principle, the construction of a duplicating apparatus with a novel arrangement in accordance with the present invention. A voltage source 1 connected to alternating-current utility lines 1a, provides an alternating-current voltage source for application to the primary winding 2 of a high-voltage transformer 3. A conventional secondary electron multiplier 4 is connected to the secondary winding of this transformer 3, in the conventional manner. Adjustable resistors 5, 6, 7 and 8 are connected in series and in the circuit between the primary winding of the transformer 3, and the output of the voltage source 1. The output voltage from the source 1 is applied through a switching contact 9a which may also be connected to another adjustable resistor 10 connected in parallel with the resistors 5, 6 and 7.

The photocathode of the electron multiplier 4 is in the path of light of a duplicating lamp 13. The light from the lamp 13 is deflected through suitable deflecting means in the form of mirrors 11 and 12, and is directed upon the photocathode. The lamp 13 illuminates the material 14 which is to be copied, and an objective lens 15 forms an image of the material to be copied upon a copying carrier, not shown. The light path of the lamp 13 can be interrupted through an electromagnetically actuated shutter 16. The shutter is closed when the electromagnet or solenoid 17 for actuating the shutter is energized.

A lamp 18 is maintained continuously lit with a constant and stabilized light output through the application of a stabilized voltage below the rated value for the lamp. The photocathode of the electron multiplier 4 is, furthermore, subjected to this continuously lit lamp 18. A shutter 19 actuated by a solenoid or electromagnet 20 lies between the photocathode of the electron multiplier and the lamp 18. When the solenoid 20 is energized, the shutter 19 is closed. A storage capacitor 21 is connected to the anode of the electron multiplier 4 in the conventional manner. Whereas one electrode of the capacitor 21 is connected to the anode of the electron multiplier, the other electrode of this capacitor 21 has ground potential applied to it. A switch 22a is connected in parallel with the capacitor 21 so that the capacitor becomes short circuited when a switching contact 22a is closed. The grid of a switching tube 23 is connected to the junction of the capacitor 21 and the anode of the electron multiplier 4. When the switching tube 23 conducts, a relay 24 connected in the plate circuit of the tube becomes energized.

The duplicating apparatus includes, furthermore, a relay 22 which operates the switching contact 22a. Thus, the latter is a contact of the relay 22. When a pushbutton 230 depresses a switching contact 240, the relay 22 becomes energized through current applied to it. A holding contact 22b is connected in parallel with the switching contact 240. The relay 22 has, furthermore, associated with it a switching contact 22c which lies in the circuit of the shutter solenoid 17. A switching contact 22d in the circuit of the solenoid 20 is also operated by the relay 22, as is the switching contact 22e in the circuit of the clock or timer 25. The clock 25 registers the closure of the switching contact 22e and also the given illuminating time. A switching contact 24a lies in series with the circuit of the relay 22. The switching contact 24a is operated by the relay 24.

A relay 9 is further provided in series with a switching contact 27 operated through a pushbutton 26. The relay 9 operates the switching contact 9a in the circuit of the primary winding of the transformer 3, and also operates a switching contact 9b in the circuit of the solenoid 17. This switching contact 9b is connected in parallel with the switching contact 22c. A further switching contact 9c in the circuit of the solenoid 20, and connected in series with the switching contact 22d, is also operated by the relay 9. The latter finally controls also the state of a switching contact 9d in the circuit of the lamp 13.

In operation, the adjustable resistors 5, 6 and 7 serve for setting the photoelectric circuit in accordance with the properties and characteristics of the copying material, and to take into account such factors, during the copying process, as the size, density or thickness, and color of the material to be copies. The sensitivity of the circuitry may also be influenced by applying these adjustable resistors in other portions of the circuit. Thus, influence over the circuitry may be exercised by applying a voltage different from zero to the capacitor 21, beforehand, At the same time, such voltage may be applied to the power circuit or the switching tube 23, and thereby accomplish the same purpose. The resistor 8 serves to take into account variations that occur over an extended period of time in the components of the duplicating apparatus. Examples of such long-term variations are changes in the characteristics of the electron multiplier 4 or variations in the electrical characteristics of the electrically operating components.

In carrying out a normal or usual duplicating process, the pushbutton 230 is depressed, and as a result the relay 22 becomes energized. The switching contact 22c opens and the shutter 16 is also consequently opened. Accordingly, the lamp 13 which is already lit, illuminates the duplicating paper and photocathode, in accordance with the brightness of the material 14 to be copied. With the energizing of the relay 22, the switching contact 22a becomes simultaneously opened, and as a result, the capacitor 21 commences to charge. The switching contact 22d closes when the relay 22 becomes energized, and thereby the shutter 19 for the lamp 18 with constant light output is also closed. The relay 22 remains latched in or remains energized through its own holding contact 22b. When the required amount of light has been incident, the relay 24 becomes energized due to the conduction of the tube 23. With relay 24 energized, the switching contact 24a of this relay opens and as a result the relay 22 becomes deenergized. The switching contact 22a thereby closes and the capacitor 21 discharges through this contact 22a. The switching tube 23 becomes thereby cut off because of the discharge of the capacitor 21. With the tube 23 in its initial nonconducting state, the copying cycle is terminated.

For calibration of the machine, the pushbutton 26 is actuated so that the switching contact 27 closes and the relay 9 becomes energized. The switching contact 9a is thereby caused to assume that position in which the adjustable resistor 10 is connected into the primary circuit of the transformer 3.

The energizing of the relay 9 causes further the switching contact 9b in series with the solenoid 17 for the shutter 16 to close, and the switching contact 9d in series with the lamp 13 to open. The switching contact 9c, at the same time, is opened, and thereby deenergizes the solenoid 20 for the shutter 19. In this state of the machine, the latter is prepared for a calibration process. If the pushbutton 230 is depressed, the photocathode of the electron multiplier 4 only becomes illuminated by the lamp 18 with a known brightness. Thus, in lieu of a normal duplicating process, the actuation of the pushbutton 230 causes the photocathode only to be illuminated through the lamp 18 with a known constant. The exposure time resulting from such illumination until a predetermined amount of light has been incident on the photocathode, is measured by the timer or clock 25, with the closure of the contact 22e. If the result as indicated by the timer does not agree with the desired value, the calibrating resistor 8 may be varied, so as to affect the sensitivity of the circuitry. The setting or adjustment of this resistor 8 may then be checked by again depressing the pushbutton 230 and noting the results realized from the timer 25.

When the calibration process is to be terminated, the switching contact 27 is opened, and as a result the relay 9 becomes deenergized. For purposes of avoiding waste of the copying paper during the calibration process, the relay 9 can be made to control means which interconnects the paper transport and the film advance.

The resistance value of the adjustable resistor 10 may be selected so that the desired exposure time, which is to be confirmed by the timer 25, has a standard value or given value of, for example, 1.00 second. The arrangement has the advantage that the resistors 5, 6, and 7 which store the properties and characteristics of the copying paper or copying material and the copy to be reproduced, retain their stored information also during the calibration process. Thus, the settings of the resistors 5, 6 and 7 remain intact during the calibration process, and their said values are fully usable again when the calibration process is terminated.

The arrangement described above is designed for a black and white copying apparatus. When color copying is to be achieved, an increased number of circuits is incurred, since each color must be provided with a corresponding arrangement.

It will be understood that each of the elements described above, or two or more together, may also find a useful application in other types of constructions differing from the types described above.

While the invention has been illustrated and described as embodied in photographic copying apparatus, it is not intended to be limited to the details shown, since various modifications and structural changes may be made without departing in any way from the spirit of the present invention.

What is claimed as new and desired to be protected by Letters Patent is set forth in the appended claims.

We claim:

1. An arrangement for controlling the exposure time in a duplicator, comprising photoelectric means for converting incident light into a corresponding electric signal; first lamp means for applying light to said photoelectric means when the duplicator is in use to carry out a duplicating operation; circuit means connected to said first lamp means and said photoelectric means for terminating the application of light by said first lamp means after the elapse of a first interval during which a first predetermined amount of light has been incident upon said photoelectric means; second lamp means for applying light to said photoelectric means when the application of light by said first lamp means is terminated to thus maintain constant the photoelectric fatigue of said photoelectric means, the intensity of light furnished by said second lamp means being constant and less than the intensity of light furnished by said first lamp means; timer means connectable to said circuit means for measuring the duration of a second interval during which a second predetermined amount of light has been incident on said photoelectric means from said second lamp means; and first resistor means connected to said circuit means, said first resistor means being adjustable to permit variations in the duration of said first interval in dependency on the length of said second interval as measured by said timer means so that the exposure time of the duplicator is adjusted to a desired value in response to adjustment of said first resistor means.

2. An arrangement as defined in claim 1, further comprising second resistor means connected in series with said first resistor means, said second resistor means being adjustable to vary the duration of said first interval as a function of the characteristics of duplicating means upon which the duplicated material appears.

3. An arrangement as defined in claim 2, further comprising third resistor means connected in series with said first resistor means, said third resistor means being adjustable to vary the duration of said first interval as a function of operational characteristics of the duplicator.

4. An arrangement as defined in claim 2, further comprising switching means connected to said resistor means for disconnecting said second resistor means from said circuit means preparatory to calibration of the duplicator.

5. An arrangement as defined in claim 4, further comprising calibrating resistor means connected to said switching means and being connected to said circuit means when said second resistor means is disconnected from said circuit means preparatory to calibration of the duplicator.

6. An arrangement as defined in claim 1, wherein said circuit means comprises means for switching off said first lamp means and for switching on said timer means as well as for starting the application of light from said second lamp means to said photoelectric means.

7. An arrangement as defined in claim 6, further comprising calibrating switching means connected to said first-mentioned switching means and being operable by hand to actuate said first-mentioned switching means.

8. An arrangement as defined in claim 6, wherein said switching means comprises a relay.

9. An arrangement as defined in claim 1, further comprising capacitor means connected to said photoelectric means and said circuit means for actuating said circuit means in response to the application of light to said photoelectric means.

10. An arrangement as defined in claim 1, further comprising first and second shutter means respectively movable across and away from the path of light issuing from said first and second lamp means, said circuit means including means for actuating said shutter means.

* * * * *